United States Patent [19]
Comte

[11] 4,165,477
[45] Aug. 21, 1979

[54] INSTRUMENT INTENDED TO BE CARRIED AT THE WRIST

[75] Inventor: Pierre Comte, Neuchatel, Switzerland

[73] Assignee: Ebauches S.A., Neuchatel, Switzerland

[21] Appl. No.: 798,075

[22] Filed: May 18, 1977

[30] Foreign Application Priority Data

May 21, 1976 [CH] Switzerland ............... 6468/76

[51] Int. Cl.² .................................................. H02J 7/00
[52] U.S. Cl. ................................. 320/61; 58/23 BA; 58/23 C; 307/72
[58] Field of Search ............... 320/2, 61; 58/23 R, 58/23 BA, 23 C; 307/44, 71, 72

[56] References Cited

U.S. PATENT DOCUMENTS

| 3,444,946 | 5/1969 | Waterbury | 320/61 UX |
| 3,613,351 | 10/1971 | Walton | 58/23 BA |
| 3,871,383 | 3/1975 | Lee | 307/71 X |

FOREIGN PATENT DOCUMENTS

| 2310589 | 5/1976 | France | 58/23 C |

*Primary Examiner*—Robert J. Hickey
*Attorney, Agent, or Firm*—Silverman, Cass & Singer, Ltd.

[57] ABSTRACT

A wrist carried instrument includes a rechargeable electric energy source for providing power to the instrument. The energy source is recharged by a pair of generators, both operatively coupled to the source and generating complementary recharging currents from different physical phenomena. The first generator may be a photo-electric cell generating a recharging current in light such as exists from the sun in summer, while the second generator may be a thermoelectric element generating a recharging current from a temperature gradient such as exists in the dark or winter.

3 Claims, 4 Drawing Figures

INSTRUMENT INTENDED TO BE CARRIED AT THE WRIST

The present invention relates to an instrument intended to be carried at the wrist, comprising a reloadable or rechargeable electric source of energy.

One knows already such instruments, which can be watches, computors, sphygmometers, receptors of signals of search of persons, etc., or combinations of such apparatuses, in which photo-electric cells are provided for recharging the electric source of energy, constituted by an accumulator or battery, when they are lighted. These instruments being intended to be carried at the wrist, they are often concealed by the sleeve of the cloath or clothing of the person which carries them, especially in winter, where, moreover, the quantity of light available is weak due to the shortness of the day, the frequent nebulosity and the weak elevation of the sun in the sky. Moreover, during the night, it is obvious that the photo-electric cells do not produce energy.

One knows also other instruments where it is thermo-electric elements which recharge the source of energy when they are submitted to a gradient of temperature such as the one which exists between the bottom of the casing of the instrument, in contact with the wrist of the user, and the surrounding atmosphere. In these instruments also, the battery is not recharged permanently, since the surrounding air does not always have a lower temperature than the user's wrist, for instance in summer.

Consequently it can be seen that, in the two types of instruments as disclosed hereabove, the charging of the battery cannot be ensured during rather long periods, which can reach several months. It is consequently necessary that this accumulator has a sufficient capacity, and consequently that it be rather voluminous, for ensuring that it does not be completely discharge so as to ensure the operation of the instrument during these periods. The photo-electric cells or the thermoelectric elements must moreover be largely dimensioned and, consequently, occupy an important volume, for ensuring the complete recharging of the battery during a time as short as possible.

The purpose of the present invention is to provide an instrument the battery of which can be recharged more regularly and in better conditions and, consequently, can be of smaller dimensions.

To this effect, the instrument according to the invention is characterized by the fact that it comprises at least two generators in which different physical phemomena are used for producing current, these two generators being arranged for furnishing, separately or in conjuction, the current necessary to the recharging of the source of electric energy.

The drawing shows, by way of example, several embodiments of the object of the invention.

Figure 1:
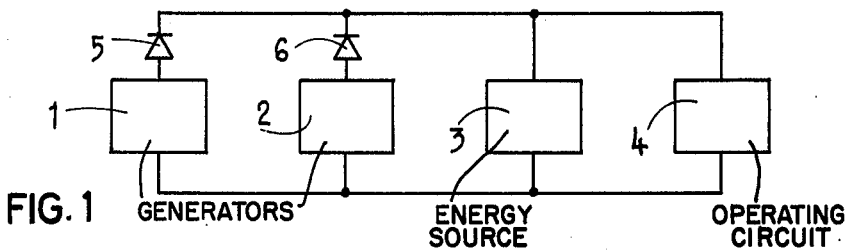
FIG. 1 is a block diagram of a first embodiment of an instrument intended to be carried at the wrist.

FIG. 1 shows the block diagram of a first embodiment comprising two generators 1 and 2 each using an energy available close to the instrument for producing electric current. This electric current is used for loading or charging or reloading or recharging an electric source of energy 3, intended to power the electric or electronic circuit 4 of the instrument, and which comprises one or several accumulators or batteries. Means 5 and 6, shown as diodes, are provided for preventing the electric energy delivered by one of the generators to be dissipated in the other, or the source 3 from discharging itself into the generators.

The generators 1 and 2 can use any physical phenomena producing the conversion, into electric energy, of an energy available in another form. The best known of these generators are photo-electric cells which convert luminous or radiant energy into an electric energy and thermoelectric elements which convert thermic energy into electric energy.

It is possible, as it has been illustrated in FIG. 1, to use directly the electric energy furnished by these generators for recharging the source, but it is often suitable to associate therewith a device intended to increase their efficiency, especially in the cases where the conditions to which they are submitted are not optimium.

Figure 2:
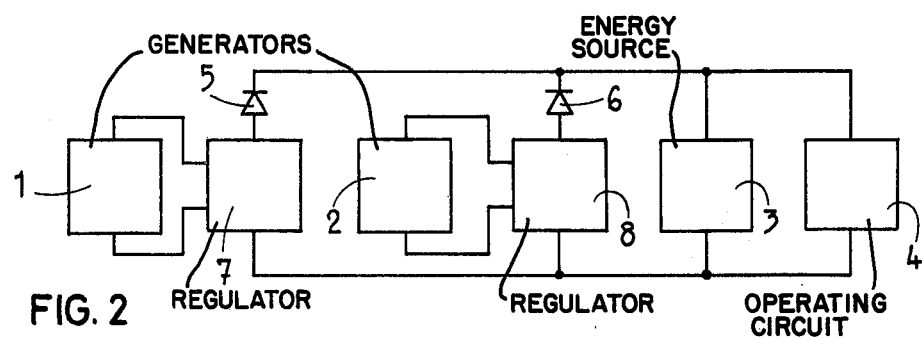
FIG. 2 is a block diagram of a second embodiment where the generators are associated to adaptation devices.

FIG. 2 illustrates an instrument in which the generator 1, constituted by a complex of photo-electric cells, is connected to a device 7 intended to adapt the current and the voltage it delivers so that the recharging of the source 3 occurs in the best conditions, whatever the lighting to which the cells are submitted may be. Such a device is disclosed, for instance, in U.S. patent application Ser. No. 746,124 filed Nov. 30, 1976.

FIG. 2 shows also that the generator 2, constituted, for instance, by a complex of thermo-electric elements, is connected to a device 8 also intended to adapt the current and the voltage it delivers so that the recharging of the source 3 be effected in the best conditions whatever the gradient of temperature to which the generator is submitted may be. This device 8 can be of the same type as the device disclosed hereinabove or can be of a type especially adapted to the thermo-electric elements.

The means 5 and 6 intended to prevent the electric energy delivered by one of the generators from being dissipated in the other are associated, in the example of FIG. 2, with the adaptation devices 7 and 8, respectively.

The interest in an instrument such as this one of FIG. 2 lies in the fact that the generators 1 and 2 are largely complementary. As a matter of fact, if the lighting is insufficient for permitting the photo-electric cells to furnish an energy sufficient for recharging the source 3, which is often the case in winter, the temperature of the air is low; the gradient of temperature to which the thermo-electric elements are submitted is then relatively high and it is the energy these thermo-electric elements furnish which recharges the source. If, on the contrary, during the summer, the temperature of the air is close to the temperature of the wrist of the user then the thermo-electric elements can ensure this recharging, it is then the quantity of light available which is important and the photo-electric cells produce the desired energy.

Figure 3:
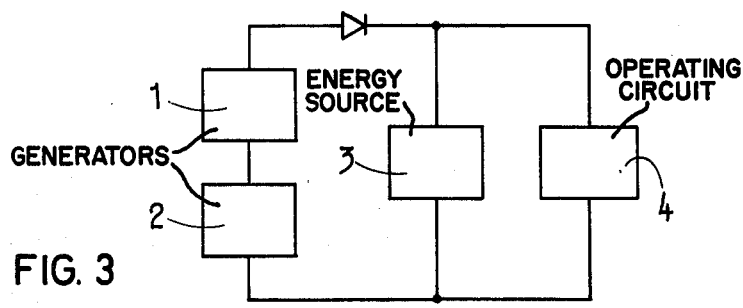
FIG. 3 is a block diagram of another embodiment where the generators are connected in series, and, FIG. 4 is a block diagram of a fourth embodiment using a control circuit for controlling the connection of the generators.

FIG. 3 shows another embodiment of the instrument in which the generators 1 and 2 are connected in series one with each other and in parallel with the source of energy 3. Such mounting is interesting when the voltage delivered by each of the generators is lower than the voltage of the source. The voltage resulting from this connection can then go beyond the voltage of the source, which is thus recharged.

Figure 4:
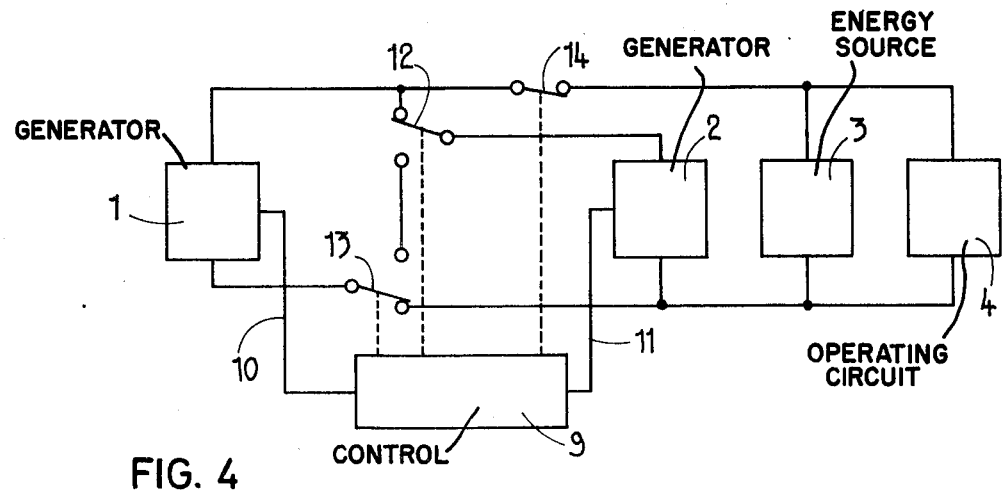

The block diagram of FIG. 4 shows another embodiment of the invention in which a control circuit 9 receives from generators 1 and 2, through connections 10 and 11, information concerning the voltage they deliver. This control circuit operates commutators or contacts 12 and 13, independently from each other so that, if the two generators deliver a sufficient voltage, the contacts occupy the position represented in the drawing in which the generator are connected in parallel, the currents they produce being combined for recharging the source 3. If one of the generators does not furnish a sufficient voltage, the corresponding contact changes into its other position, interrupting the connection of this generator with the source. If the voltage of the second generator becomes also insufficient, the second contact changes also into its other position and the generators are then connected in series. Their voltages are combined, permitting thus the recharging of the source. If, at last, even the sum of voltages becomes insufficient, the control circuit acts on the contact 14 which opens the circuit and separates completely the generators from the source 3.

It is obvious that the block diagram of FIG. 4 has only diagrammatic value. In practice, the 12 and 13 and the contact 14 would be replaced by electronic circuits which would be integrated, as the control circuit 9 and the adaptation circuits 7 and 8, with the electronic circuits of the instrument.

Moreover, the generators 1 and 2 can be associated, in the instruments as diagrammed in FIGS. 3 and 4, to devices such as these disclosed in the case of FIG. 2.

The examples given hereabove are not limiting. There are other types of generators which can use other physical phenomena, such as, for instance, piezo-electric generators, generators using the force of gravitation, etc., which can be used advantageously in the present instrument.

What I claim is:

1. An improved instrument adapted to be carried on the wrist of a user including a rechargeable electric source for providing power for the instrument, said improvement comprising:

means for recharging said source, said recharging means including two generators, one generator generating a first charging current in response to a first physical phenomenon coupled to said source and a second generator generating a second charging current in response to a second different physical phenomenon coupled to said first generator and said source, the generators being connected in series one with another.

2. An improved instrument adapted to be carried on the wrist of a user, and including a rechargeable electric source for providing power for the instrument, the improvement comprising:

means for recharging said source, said recharging means including a photo-electric generator and a thermo-electric generator connected to provide either separately or in combination the current needed for recharging said source.

3. Instrument as claimed in claim 2, characterized by the fact that the said generators, which are connected in parallel between themselves and with the said source are provided with means preventing the energy furnished by one of them to be dissipated into the other one.

* * * * *